Dec. 9, 1969  G. LEURENT  3,482,819
METAL RAILINGS AND SIMILAR ELEMENTS
Filed May 1, 1968  5 Sheets-Sheet 1
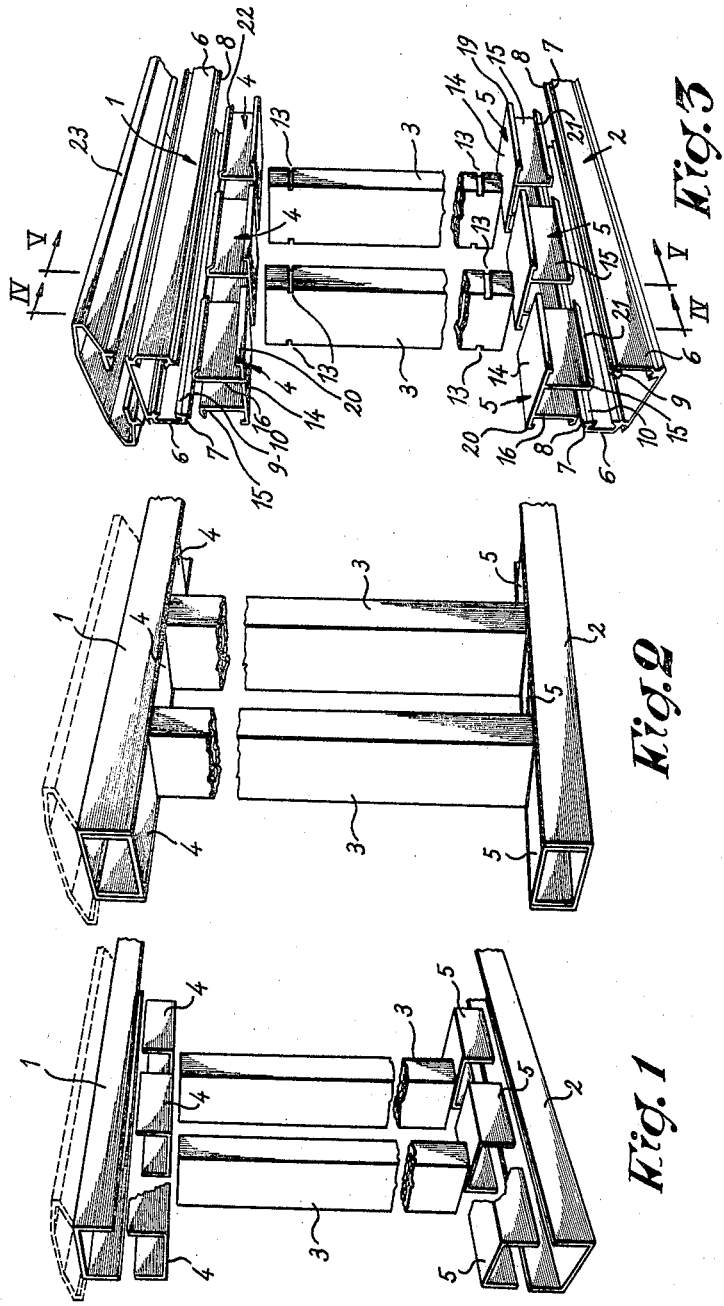
INVENTOR.
G. Leurent
BY
Richards & Geier
ATTORNEYS

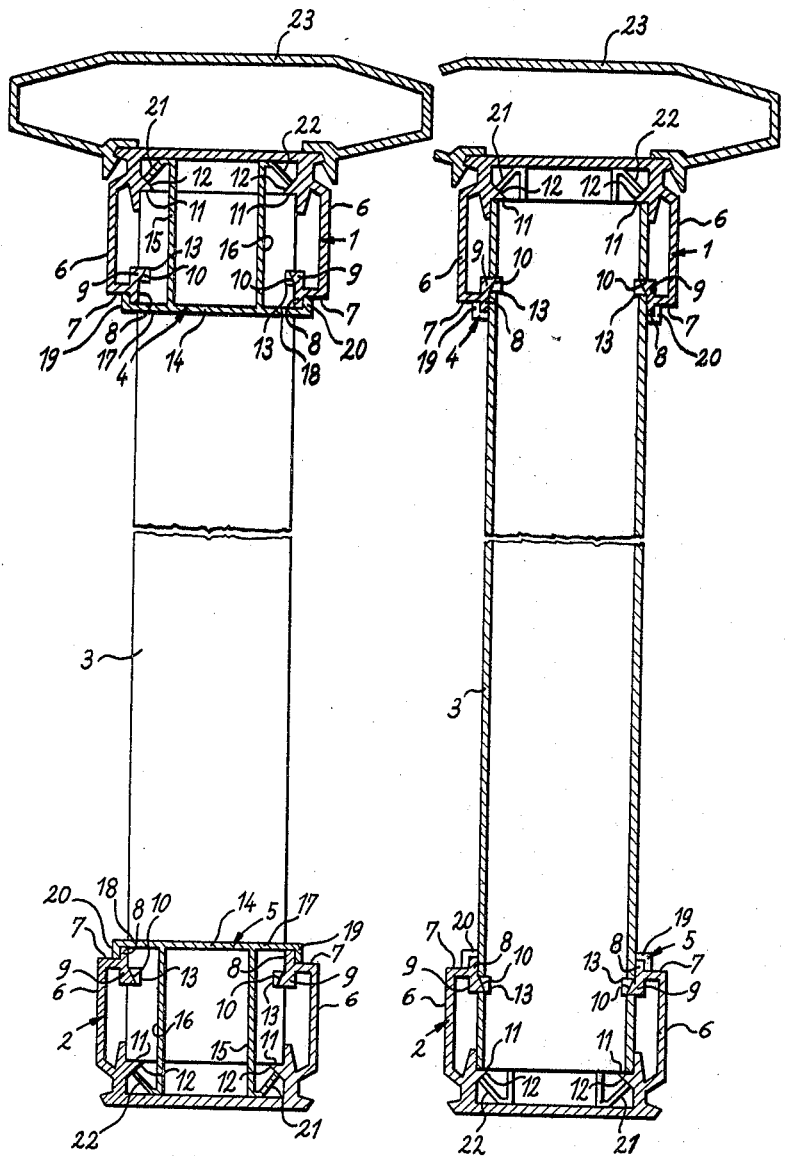

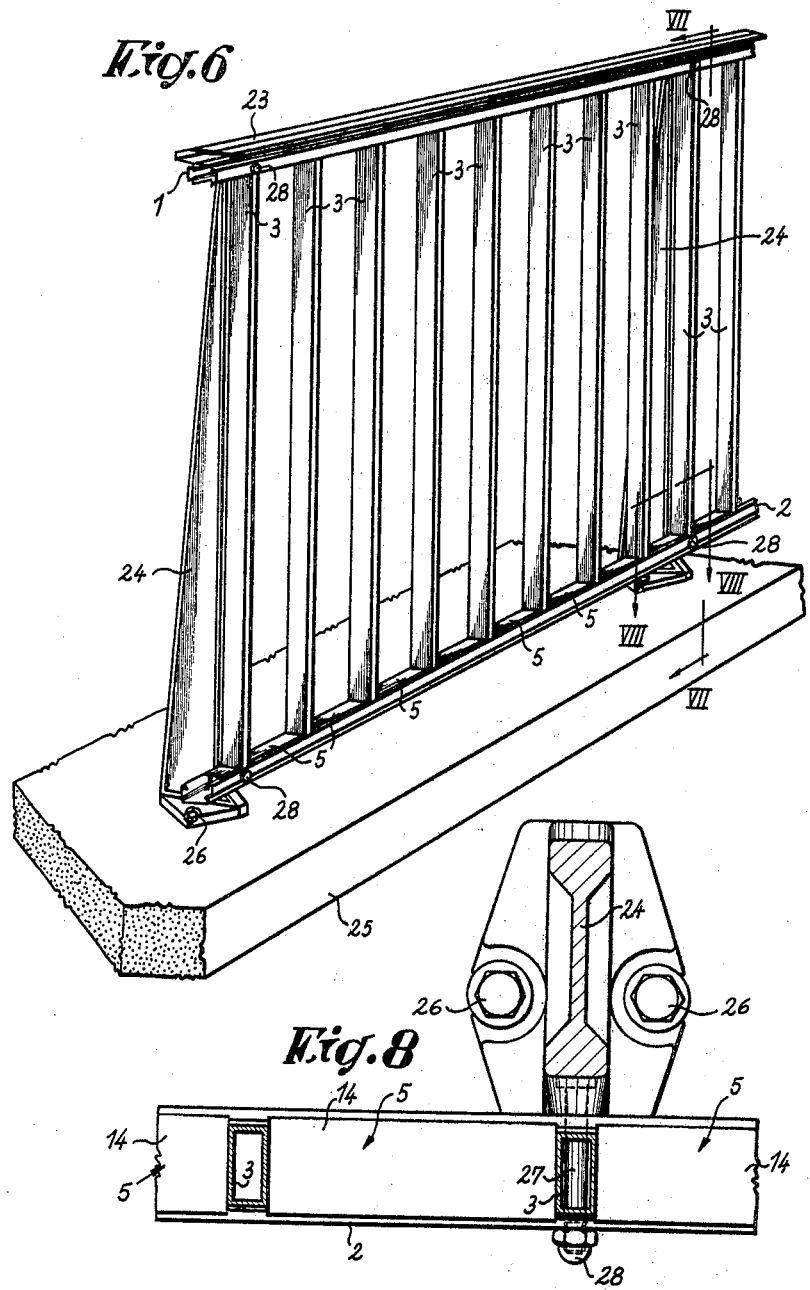

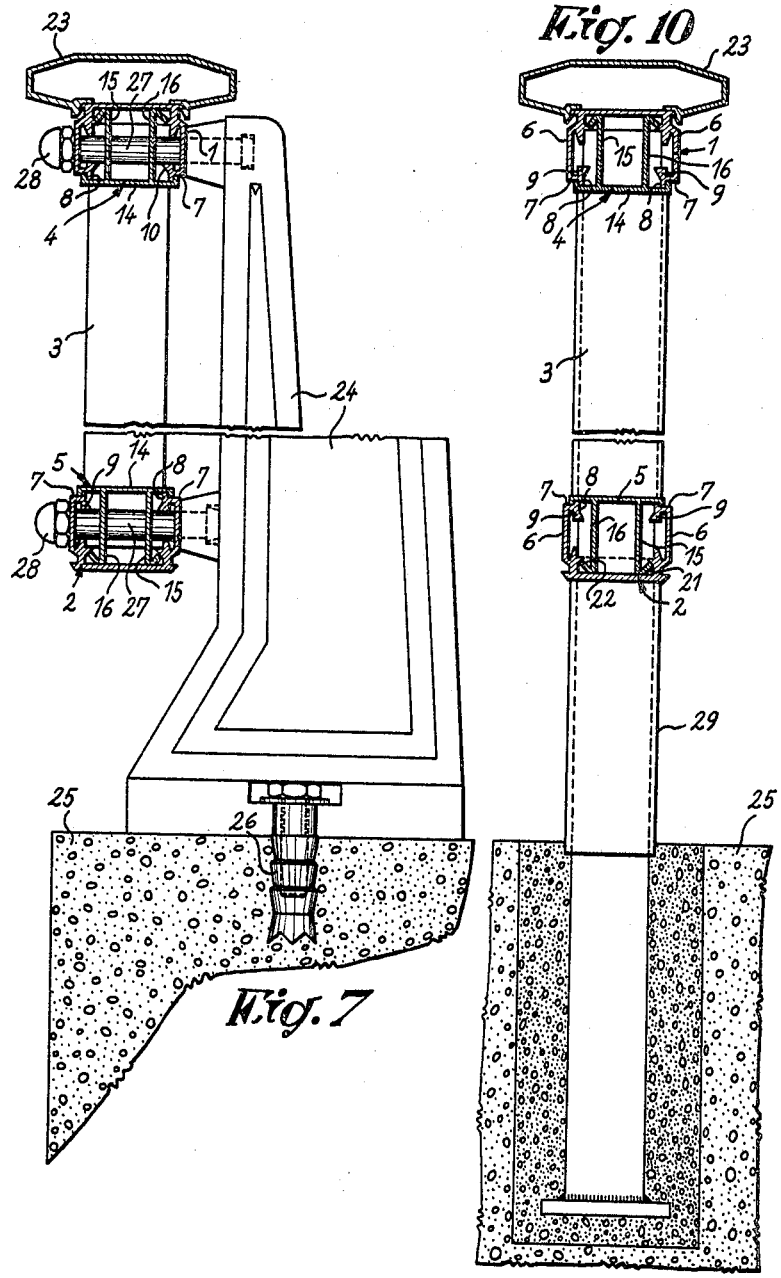

Dec. 9, 1969   G. LEURENT   3,482,819
METAL RAILINGS AND SIMILAR ELEMENTS
Filed May 1, 1968   5 Sheets-Sheet 5
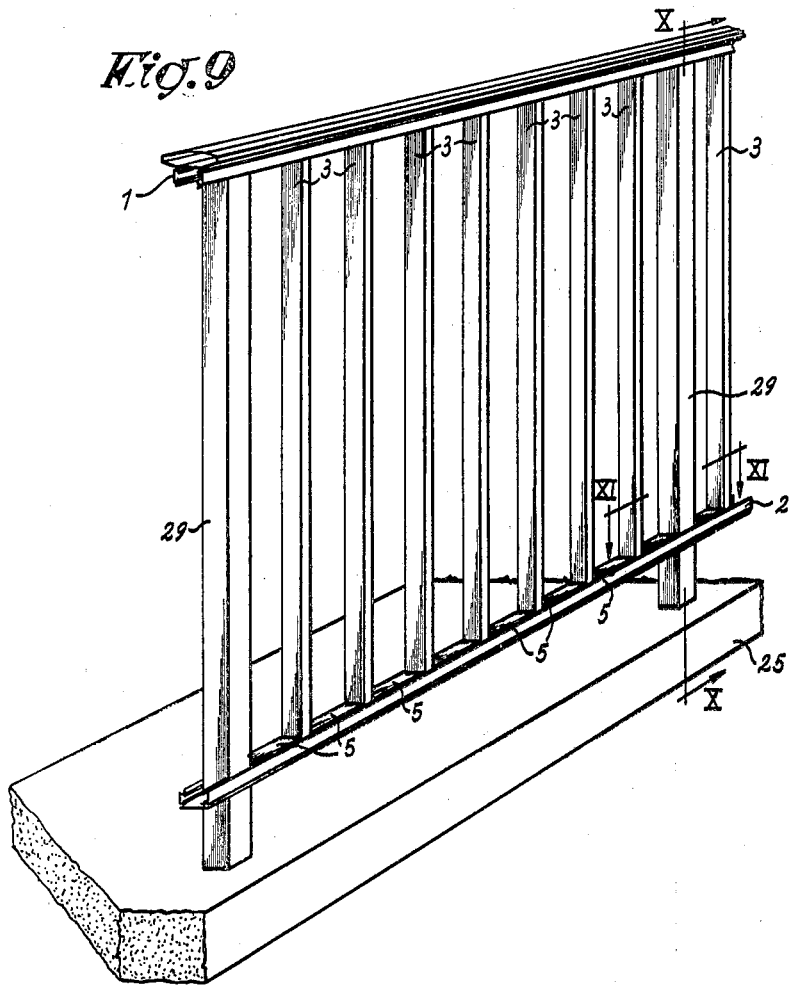
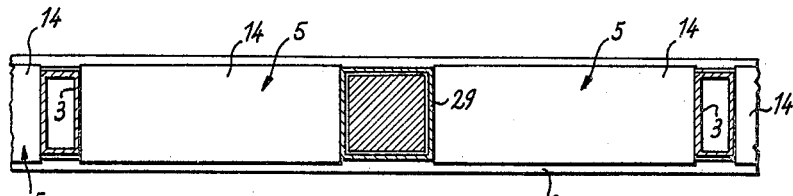
INVENTOR.
G. Leurent > United States Patent Office 3,482,819
Patented Dec. 9, 1969

3,482,819
METAL RAILINGS AND SIMILAR ELEMENTS
Ghislain Leurent, Mouscron, Belgium, assignor to Societe Industrielle de TRANsformation des PLASTiques, Societe Anonyme Tourcoing, Nord, France, a body corporate of France
Filed May 1, 1968, Ser. No. 725,616
Claims priority, application France, May 5, 1967, 105,333; Jan. 15, 1968, 136,003
Int. Cl. E04h *17/14*
U.S. Cl. 256—59                                       1 Claim

ABSTRACT OF THE DISCLOSURE

This invention concerns a railing of the type formed by the assembly of sections, consisting in the combination of at least two beams; between these two beams, uprights of which the ends are engaged in the beams in question; between said uprights, inserted elements which are also engaged into aforesaid beams, whereby these elements are mutually assembled and bonded together by consecutive hookings due to a local elastic distortion, which in turn is the result of a pressure.

---

The present invention concerns the manufacture of metal railings and similar elements such as balustrades, gratings, parapets, barriers, fences, etc.

More particularly, the invention concerns such elements consisting of beams braced with uprights, whereby either are made of metal sections, such as sections of light alloy.

Several solutions have already been suggested for making use of metal sections of various shapes and dimensions, mutual fastening means of adjacent elements of very different nature and, in certain cases, use has already been made of elements fastened by mere pressure, this means being hereafter called "fastening by clippage."

The various solutions which have been suggested are either complex and costly, or slow and difficult to assemble. On the other hand, some solutions leave, after assembly, open sections which is particularly harmful for the proper and clean maintenance of the element in question.

In a general way, the means suggested imply the use of loose fastening elements, the use of tools for the assembly and, above all, a percentage of costly mechanization and finishing work for making the various parts or some of them.

The object of the present invention is to provide metal elements generally called "railings," in such way that the assembly and the fastening of all the constituent elements thereof can be carried out rapidy without use of any tools or specialized labour, all by means of extruded elements, so that they can be manufactured rapidly and comparatively cheaply in an industrial way.

Another object of the present invention consists in making such metal elements called "railings," in such way that, after assembly and in the absence of all fastening elements, all sections forming respectively the beams and the inserts or uprights, are entirely closed sections consisting of hollow elements.

Still another object of the present invention consists in making such constructional elements, respectively hand- or side-railings of all kinds by means of a comparatively small number of duly standardized sections for forming an infinite amount of assemblied combinations.

SUMMARY OF THE INVENTION

The objects of the invention are realized through the provision of a railing having at least two parallel longitudinal beams of substantially V-shaped cross section and with two side walls. Each side wall has a rib at its one end and a second rib close to the bottom wall of the beam. This second rib has a groove. There are at least two uprights the ends of which are perpendicularly mounted between the side walls of the beams so that they engage the grooves of the beams. Cover members are clipped on the beams so as to cover the open sides of the beams between the uprights. The side walls of these cover members cooperate with the ribs in order to correctly position the cover members relatively to the beams.

It results from this arrangement that the assembly and the fastening together of these various elements can be secured quite fast and without the help of any tools. Another result obtained thereby is that all beams, uprights or braces assume, after assembly, the shape of closed sections.

Finally, another result is that the beams, uprights or braces come systematically and without preliminary tracing or particular precaution into their proper places by the very fact of the assembly system which has just been described.

The constructional elements obtained this way can of course be completed by any additional arrangement or element, either for usefulness or for an ornamental purpose. More particularly, the upper beam will generally be fitted with a hand-rail or any other appropriate element.

The various characteristics of the present invention will appear more clearly from the detailed description given hereafter of a form of embodiment, merely by way of example and without implying any limiting or exclusive features, with reference to the appended drawings of which:

FIGURE 1 shows diagrammatically and as summarily as possible, an exploded perspective view, with partial cross-section, of the assembly device conforming to the present invention;

FIGURE 2 is a similar view to that of FIGURE 1, after assembly;

FIGURE 3 is a view similar to that of FIGURE 1, but referring to the practical construction of a railing;

FIGURES 4 and 5 illustrate cross-sections by planes of which the traces follow respectively the straight lines IV—IV and V—V of FIGURE 3;

FIGURE 6 is a partial perspective view of a railing conforming to the present invention;

FIGURES 7 and 8 illustrate cross-sections by planes of which the traces follow respectively the straight lines VII—VII and VIII—VIII of FIGURE 6;

FIGURE 9 is a variant of a railing constructed according to the present invention;

FIGURES 10 and 11 are cross-sections by planes of which the traces follow respectively the straight lines X—X and XI—XI of FIGURE 9.

In the most general way, the railing according to the present invention is diagrammatically represented in FIGURES 1 and 2.

In this diagrammatic illustration, it can be seen that the railing is formed by the combination of two beams 1, 2 represented, in this instance, under the shape of U-sections with facing concavities; the uprights and bracings 3 are formed by closed sections, in the present instance caisson-type sections of prismatic shape; the upper and lower braces 4, 5 respectively, shown, in the present instance, as having the shape of U-sections with opposite convexity, whereby the inserted elements close to the beam lengths 1, 2 respectively, delimited by aforesaid uprights 3. According to a characteristic feature of the present invention, the uprights 3 are connected to the beams 1, 2, whilst the inserted elements 4, 5 are fastened, respectively, to aforesaid beams 1, 2 by any suitable means, provided that, by way of principal fastening means and in a general way as only fastening means, use is being made of such means provided that no use is made of loose fastening elements such as screws, bolts, rivets, soldering, wedges, etc.

In a preferred but not exclusive way the fastening between the various juxtaposed elements will be carried out by a kind of hooking effect subsequent to a local elastic distortion of the material, which distortion is itself due to pressure. The result is that any kind of sections or local arrangements can be chosen, provided that a hooking following an elastic distortion is obtained thereby.

This kind of fastening is generally called "clippage."

Such a practical way of proceeding is illustrated in detail in FIGURES 3 to 8. In this form of embodiment, we see both beams 1, 2, the braces or uprights 3 and the inserts 4, 5. In this form of embodiment, the beams 1, 2 generally assume the shape of U-sections of which the side-walls 6 are shaped so as to have, on top, an inner rib of such characteristic shape that they delimit a shoulder 7, an upper ledge 8 and a lower extension 9 essentially characterized by a general triangular shape, thus forming an inclined plane 10 pointing toward the inside and the bottom of the section. At the lower part, aforesaid side-walls 6 are shaped so as to show an inner rib of which the form is such that it delimits a shoulder 11 and an inclined surface 12 pointing toward the inside and toward the opening of the section.

The uprights or braces 3 consisting, in the present instance, of entirely closed caisson-shaped sections, have, at a certain distance of their two ends, an on each side-face, a notch 13. These notches are so shaped with respect to form, dimensions and relative position that, when they bear by their end face onto the bottom of aforesaid shoulder 11, they are engaged by the lower extension with triangular shaped cross-section 9. The relations between the dimensions of the elements which are thus mutually engaged are such that the ends of aforesaid braces or uprights 3 are capable of distorting locally and elastically aforesaid hooking extensions 9 which recover their initial form and position when they are brought to face aforesaid notches 13.

In this way, a simple and efficient fastening means is secured by clippage, without any tool or loose part. On the other hand, the inserts 4, 5, in the present instance, are substantially U-shaped, their median wall 14 being extended on either side of the extreme walls 15, 16 so as to form two overhanging wings, 17, 18 respectively, of which the bordering edges are upturned by 90° so as to form ledges 19, 20 respectively, parallel to aforesaid extreme walls 15, 16. The free edges of the latter are bent toward the outside so as to form two diverging hooking ledges, 21, 22 respectively, of which the slope is of the order of 40° for instance. The various constituent parts of these inserts 5, 6 are manufactured with respect to shape, dimension and relative position in such way that, when aforesaid upper ledges 19, 20 are correctly adjacent to the outer faces of the upper ledge 8 of the beams, the diverging hooking ledges 21, 22 are engaged between the bottom of the beam and the inclined faces 12 of the corresponding ribs of the beams. In this way one obtains, both a clippage means, a strong fastening, a perfect centering of both inserted wings and a closure of the corresponding parts of the beams 1, 2. These inserts 4, 5 can thus be engaged and fastened by simple pressure, which also means without help of any tool or loose fastening means.

It will naturally be understood that the same effect could be obtained by an indetermined number of different sections forming the hooking elements subsequent to a local elastic distortion.

The railing manufactured in this way can evidently be completed by any desired and needed elements. In a general way, the upper beam 1 will act as a part of a hand-rail 23 in any convenient form, dimensions and material.

One form of embodiment is illustrated in the appended drawings, and more particularly in FIGURES 4 and 5, whereby said hand-rail could also be fastened by a clippage effect, respectively by means of a hooking effect following an elastic distortion, to the longitudinal ledges of the upper beam 1.

On the other hand, it may be possible to fasten this object in very numerous ways without causing the fastening means as such, to alter the object of the invention. So for instance, as illustrated in FIGURES 6, 7 and 8, it may be possible to make use of an offset railing. With this object in view, a certain number of poles of any convenient dimensions will be used, such as, for instance, those illustrated in 24, whereby said poles would be solidly fastened to the support 25 by any of fastening such as that shown diagrammatically in 26. Onto these poles 24 are fastened, by any appropriate means, fingers 27 which go right through the corresponding part of the lower beam 5 and are firmly fastened thereonto by nuts 28 for instance or by any other means, known as such.

It might also be considered, as shown more particularly in FIGURES 9, 10 and 11, to use a more straightway mode of fastening by using poles 29 going right through the lower beam 2 and being firmly fastened to the underlying supports 25.

Both these assembling and fastening means can be applied in an infinity of variable forms.

The present invention concerns any railings or similar structures of any kind whatsoever in accordance with the invention as well as any constituent part thereof, respectively any kind of section, conditioned so as to make such railings. The invention also concerns any combination or any kind of structure including such railing or essential constituent parts thereof.

What I claim is:

1. A railing, comprising in combination, two parallel longitudinal beams, each of said beams being substantially U-shaped in cross section and having two side walls and a bottom wall, at least two uprights having ends perpendicularly engaged between the side walls of said beams, cover members fixed to said beams and covering open sides of said beams between said uprights, each of said side walls having a free edge, a substantially L-shaped inwardly directed first rib located adjacent said free edge and having a portion parallel to the bottom wall and another portion directed away from the bottom wall and a second inwardly directed rib located adjacent the bottom wall and having an inclined portion facing the bottom wall and a groove directed towards the inner side of the beam, each of said cover members having a transverse wall, two inner larger side walls and two outer smaller side walls, the side walls of each cover member extending perpendicularly to said transverse wall, each of said inner side walls of the cover members having a free end which is bent outwardly toward the transverse wall, the ends of said uprights engaging the grooves of the second ribs of said side walls, said outer side walls of the cover members contacting the first-mentioned ribs of said side walls, said free ends of the inner side walls of the cover members being engaged between said inclined portions of the second ribs of the side walls and said bottom wall of the beam.

(References on following page)

References Cited

UNITED STATES PATENTS

| | | | |
|---|---|---|---|
| 2,808,233 | 10/1957 | Spescha | 256—22 |
| 3,009,549 | 11/1961 | Miller. | |
| 3,246,879 | 4/1966 | Case et al. | 256—24 |
| 3,305,221 | 2/1967 | Kling | 256—24 X |
| 3,385,567 | 5/1968 | Case et al. | 256—24 |

FOREIGN PATENTS

| | | |
|---|---|---|
| 1,220,041 | 1/1960 | France. |
| 350,981 | 2/1961 | Switzerland. |

DENNIS L. TAYLOR, Primary Examiner

U.S. Cl. X.R.

256—21